US012656502B2

(12) United States Patent
Bandi et al.

(10) Patent No.: US 12,656,502 B2
(45) Date of Patent: Jun. 16, 2026

(54) NODE-BASED GLOBAL NAVIGATION SATELLITE SYSTEM

(71) Applicant: Resilient Timing Systems, LLC, Tuscaloosa, AL (US)

(72) Inventors: Thejesh N. Bandi, Tuscaloosa, AL (US); Adam Joseph Hauser, Tuscaloosa, AL (US); Patrick Kung, Vestavia Hills, AL (US)

(73) Assignee: Resilient Timing Systems, LLC, Tuscaloosa, AL (US)

( * ) Notice: Subject to any disclaimer, the term of this patent is extended or adjusted under 35 U.S.C. 154(b) by 343 days.

(21) Appl. No.: 18/366,790

(22) Filed: Aug. 8, 2023

(65) Prior Publication Data

US 2024/0369715 A1      Nov. 7, 2024

Related U.S. Application Data

(60) Provisional application No. 63/370,852, filed on Aug. 9, 2022.

(51) Int. Cl.
G01S 19/12        (2010.01)
G01S 19/21        (2010.01)

(52) U.S. Cl.
CPC ............ G01S 19/12 (2013.01); G01S 19/215 (2013.01)

(58) Field of Classification Search
CPC ....... G01S 19/12; G01S 19/215; G01S 19/256
See application file for complete search history.

(56) References Cited

U.S. PATENT DOCUMENTS

| | | | |
|---|---|---|---|
| 10,207,816 B1 * | 2/2019 | Husain ................. | G01M 17/00 |
| 2019/0317221 A1 * | 10/2019 | Molina-Markham ........................ | |
| | | | G01S 19/215 |
| 2021/0026022 A1 * | 1/2021 | Kennedy ............... | G01S 5/0257 |
| 2021/0157013 A1 * | 5/2021 | Lyusin .................. | H04W 4/027 |
| 2022/0338014 A1 * | 10/2022 | Luomi .................. | H04W 12/66 |
| 2023/0003907 A1 * | 1/2023 | Grayson ............... | G01S 19/423 |
| 2023/0333258 A1 * | 10/2023 | Klochikhin .............. | B60S 5/02 |
| 2024/0151800 A1 * | 5/2024 | Stevens ............. | H04W 56/0015 |

* cited by examiner

*Primary Examiner* — William Kelleher
*Assistant Examiner* — Kenneth W Good
(74) *Attorney, Agent, or Firm* — Meunier Carlin & Curfman LLC

(57)        ABSTRACT

A node-based ground mesh system with Artificial Intelligence (AI) capability for ensuring redundancy and real-time attack mitigation as an independent augmentation system for the Global Positioning System (GPS) or Global Navigation Satellite System (GNSS) is provided. The system includes a plurality of nodes distributed across a geographic area forming a mesh network of nodes. A node can be fixed or in motion and has its precisely determined position and AI capabilities, in any given geographical location. Each node receives GNSS signals from one or more GNSS satellites and distributes its own real-time emulated PNT signal to the other nodes and a user receiver, that may be used for PNT in the event that the GNSS satellites' signals become compromised or are unavailable. Based on the emulated PNT signals received for each node and the GNSS signal received from the one or more satellites, each node may use an artificial intelligent-based model to determine a 'trust status' for every other node as well as the one or more GNSS satellite system.

14 Claims, 6 Drawing Sheets

100

100

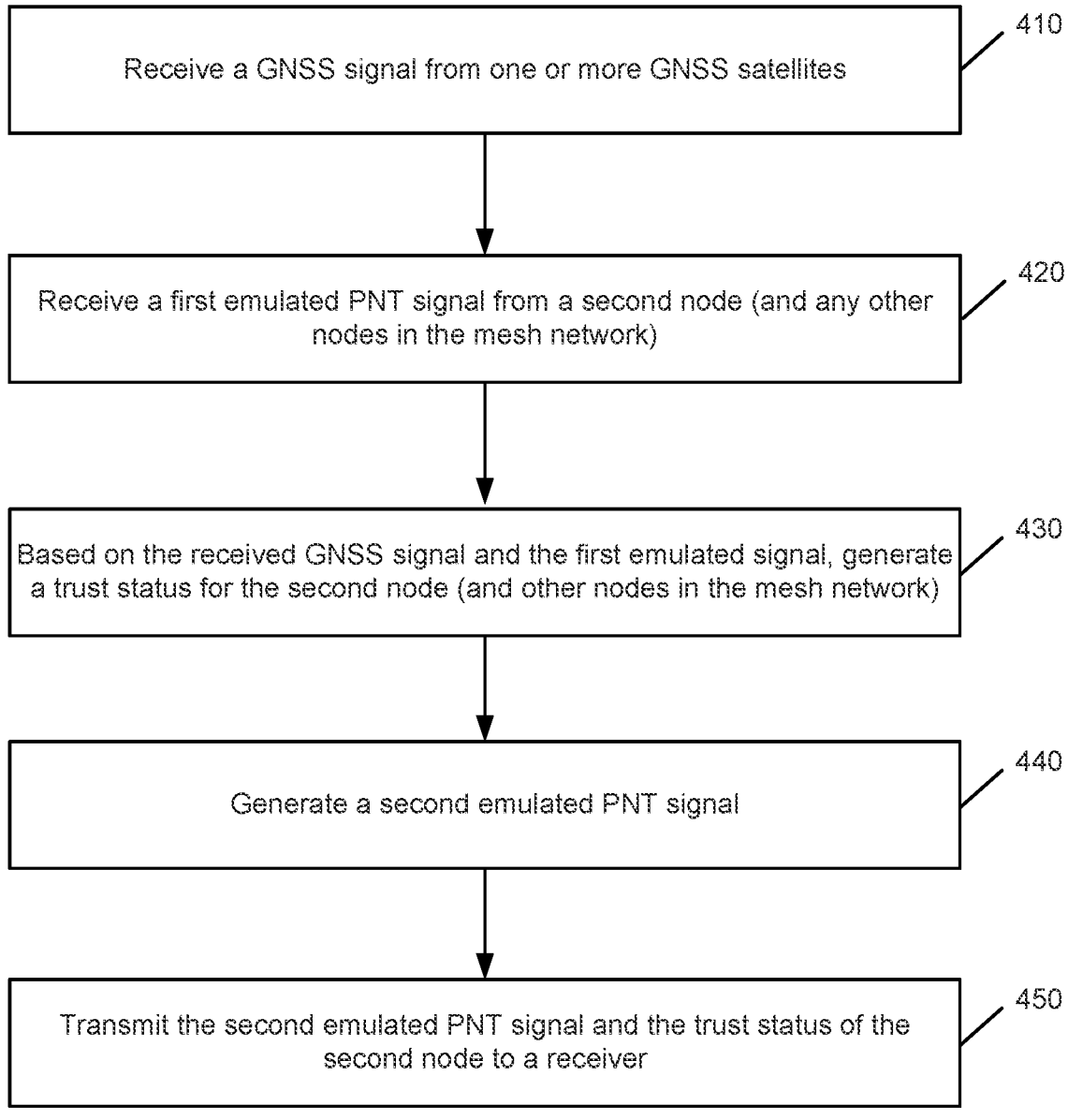

Receive a GNSS signal from one or more GNSS satellites — 410

Receive a first emulated PNT signal from a second node (and any other nodes in the mesh network) — 420

Based on the received GNSS signal and the first emulated signal, generate a trust status for the second node (and other nodes in the mesh network) — 430

Generate a second emulated PNT signal — 440

Transmit the second emulated PNT signal and the trust status of the second node to a receiver — 450

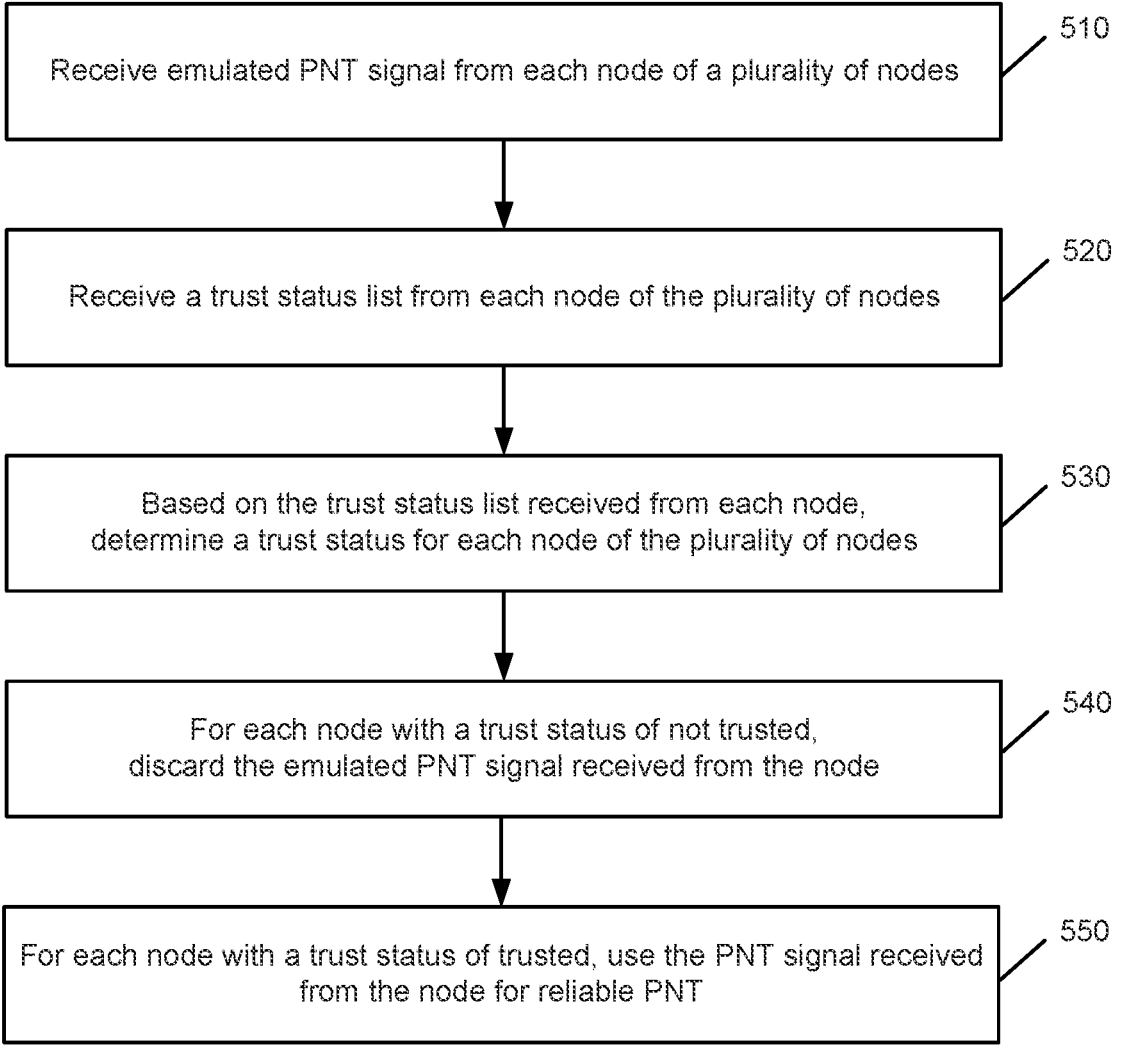

Receive emulated PNT signal from each node of a plurality of nodes — 510

Receive a trust status list from each node of the plurality of nodes — 520

Based on the trust status list received from each node, determine a trust status for each node of the plurality of nodes — 530

For each node with a trust status of not trusted, discard the emulated PNT signal received from the node — 540

For each node with a trust status of trusted, use the PNT signal received from the node for reliable PNT — 550

NODE-BASED GLOBAL NAVIGATION SATELLITE SYSTEM

CROSS-REFERENCE TO RELATED APPLICATIONS

This application claims priority to U.S. Provisional Patent No. 63/370,852, filed on Aug. 9, 2022, entitled "NODE-BASED GLOBAL NAVIGATION SATELLITE SYSTEM." The contents of which is hereby incorporated by reference.

BACKGROUND

Positioning, Navigation and Timing (PNT) is the backbone for autonomous vehicles, be it on land, water, or air. While assessment and development of best practices, standards and testing methodology based on the current state-of-the-art is a critical first step, the current PNT system that will run the autonomous vehicle infrastructure of the future (to say nothing of the one-third of the economy directly reliant on PNT) lacks resilience, robustness and adaptability. Although technology to indicate when a system may be subject to jamming, spoofing, or interference exists, there is no availability of "real-time mitigation solutions" or "backup system". Therefore, the critical infrastructure that is dependent on PNT is vulnerable to easy attacks. Furthermore, the need for reliable and safe PNT in the field of autonomous vehicles is fast increasing. In many cases, the loss of the Global Navigation Satellite System (GNSS) is the loss of certifiable, safe PNT.

SUMMARY

A node-based ground mesh system with Artificial Intelligence (AI) capability for ensuring redundancy and real-time attack mitigation for the GNSS is provided. The system includes a plurality of nodes distributed across a geographic area forming a mesh network of nodes. Each node receives a GNSS signal from one or more GNSS satellites and distributes its own real-time emulated PNT signal to the other nodes and a user receiver, that may be used for PNT in the event that the GNSS satellites' signals become compromised or are unavailable. Based on the emulated PNT signals received for each node and the GNSS signal received from the one or more satellites, each node may use an artificial intelligent-based model to determine a 'trust status' for every other node as well as the one or more GNSS satellites. The determined trust status for a node may indicate whether the node, or the one or more GNSS satellites, has been compromised (e.g., hacked) or is malfunctioning. Some or all of the nodes in the line of sight may provide their emulated PNT signals and determined trust statuses to one or more end user receivers. The receivers have a built-in AI capability. Each receiver may use the PNT signals and trust statuses received from one or more of the nodes to determine which GNSS signals can be unconditionally trusted, and hence compute using its AI capability to determine its uncompromised PNT ensuring the safety and reliability of the end user.

In some aspects, the techniques described herein relate to a method including: receiving a GNSS signal from one or more GNSS satellites by one or a plurality multiple nodes; performing a crosslink synchronous communication between the plurality of nodes; based on the received GNSS signal and an emulated AI capable PNT signal, determining a trust status of the plurality of nodes and synchronization between the plurality of nodes; and transmitting the generated AI capable PNT signal and the trust status from the nodes to a user receiver.

In some aspects, the techniques described herein relate to a method, wherein the first node and the second node are part of a plurality of nodes of a mesh network, and each node may be a fixed location or in motion on a vehicle at variable speeds up to five times the speed of sound.

In some aspects, the techniques described herein relate to a method, further including: based on the received GNSS signals, determining a trust status of the one or more GNSS satellites in real-time with low latency; and transmitting the generated second PNT signal, the trust status of the nodes, and trust status of the one or more GNSS satellites by node to a ground navigation system.

In some aspects, the techniques described herein relate to a method, further including: generating a precise local time within the nodes using atomic clocks; comparing the generated time with timing and clock errors from the received GNSS signals; and determining the trust status of the one or more GNSS satellites by the nodes based on the AI algorithm comparison protocol.

In some aspects, the techniques described herein relate to a method, further including: determining trust statuses of any of the nodes; and transmitting the generated second PNT signal, and trust statuses of the nodes to one or more the receivers.

In some aspects, the techniques described herein relate to a method, wherein determining the trust status of the first node includes receiving data indicating whether the first node was compromised, and determining the trust status of the first node using the received data, and a local AI decision to ignore such compromised signal.

In some aspects, the techniques described herein relate to a method, further including transmitting the generated second PNT signal and trust status of the second node to an end user receiver.

In some aspects, the techniques described herein relate to a method, wherein the first node and the second node are part of a plurality of nodes of a mesh network and may scale up to as many number of nodes as necessary based on an area to be covered for a safe PNT, wherein the mesh network may use an Artificial Intelligence based neural network among more than one node and with an information server, and wherein Artificial Intelligence based methods may be implemented to synchronize the timing and data transfer between the nodes and with an information server.

In some aspects, the techniques described herein relate to a method, wherein the mesh network may be connected via the optical fibers and/or wireless networking, the information server may consist of ultra-stable atomic clocks or an ensemble of atomic clocks which are synchronized to the Universally Coordinated Time (UTC), the information server may be used to synchronize the nodes and maintain the mesh network timing.

In some aspects, the techniques described herein relate to a method including: receiving a PNT signal from each node of a plurality of nodes by a receiver; receiving a trust status list from each node of the plurality of nodes by the receiver; based on the trust status list received from each node of the plurality of nodes, determining a trust status for each node of the plurality of nodes by the receiver, wherein the trust status for a node is one of trusted or not trusted; for each node of the plurality of nodes with a trust status that is trusted, using the PNT signal received from the node to provide PNT by the receiver; and for each node of the plurality of nodes with a trust status that is not trusted, discarding the PNT signal received from the node by the receiver.

In some aspects, the techniques described herein relate to a method, further including: receiving a GNSS signal from one or more GNSS satellites by the receiver; and based on the trust status list received from each node of the plurality of nodes, determining a trust status for the one or more GNSS satellites and the GNSS signals' integrity by the receiver.

In some aspects, the techniques described herein relate to a method, further including: If the trust status of the one or more GNSS satellites is trusted, using the GNSS signal to provide PNT by the receiver; and If the trust status of the one or more GNSS satellites is not trusted, discarding the GNSS signal by the receiver.

In some aspects, the techniques described herein relate to a method, wherein the plurality of nodes includes any number of nodes depending on the geographical area to be covered.

In some aspects, the techniques described herein relate to a system, wherein the computing device is part of an autonomous vehicle or any application where reliable and safe PNT is desired.

In some aspects, the techniques described herein relate to a system including: a receiver; one or more GNSS satellites; and a plurality of nodes, wherein each node is adapted to: receive a GNSS signal from the one or more GNSS satellites; receive a first emulated PNT signal from another node of the plurality nodes; based on the received GNSS signal and the first PNT signal, determine a trust status of the another node; generate a second emulated PNT signal from the received GNSS signal; and transmit the generated second emulated PNT signal and trust status of the another node to the receiver.

In some aspects, the techniques described herein relate to a system, wherein the plurality of nodes includes any number of nodes in the network required for better and unconditional signal coverage.

In some aspects, the techniques described herein relate to a system, wherein each node is further adapted to: based on the received GNSS signal, determine a trust status of the one or more GNSS satellites; and transmit the generated second PNT signal, the trust status of the another node in the mesh network, and trust status of the one or more GNSS satellites to the receiver.

In some aspects, the techniques described herein relate to a system, wherein each node is further adapted to: determine a time; compare the determined time with the time from the received GNSS signal; and based on the determined time and the time from the received GNSS signal, determine the trust status of the one or more GNSS satellites.

In some aspects, the techniques described herein relate to a system, wherein each node is further adapted to: determine a trust status of the node; and transmit the generated second emulated PNT signal, trust status of the another node, and the trust status of the node to the navigation system.

In some aspects, the techniques described herein relate to a system, wherein the node adapted to determine the trust status of the node includes the node adapted to: receive data indicating whether the node was compromised, and determine the trust status of the node using the received data.

In some aspects, the techniques described herein relate to a method including: receiving a GNSS signal from one or more GNSS satellites by a first node; receiving a first emulated GNSS signal from a second node by the first node; based on the received GNSS signal and the first emulated GNSS signal, determining a trust status of the second node by the first node; generating a second emulated GNSS signal from the received GNSS signal by the first node; and transmitting the generated second emulated GNSS signal and trust status of the second node by the first node to a receiver.

In some aspects, the techniques described herein relate to a method, wherein there are at least four nodes.

In some aspects, the techniques described herein relate to a method, further including: based on the received GNSS signal, determining a trust status of the one or more GNSS satellites; and transmitting the generated second emulated signal, the trust status of the second node, and trust status of the one or more GNSS satellites by the first node to the receiver.

In some aspects, the techniques described herein relate to a method, further including: determining a time by the first node; comparing the determined time with a time from the received GNSS signal; and based on the determined time and the time from the received GNSS signal, determining the trust status of the one or more GNSS satellites.

In some aspects, the techniques described herein relate to a method, further including: determining a trust status of the first node by the first node; and transmitting the generated second emulated signal, trust status of the second node, and the trust status of the first node by the first node to the receiver.

In some aspects, the techniques described herein relate to a method, wherein determining the trust status of the first node includes receiving data indicating whether the first node was compromised, and determining the trust status of the first node using the received data.

In some aspects, the techniques described herein relate to a method, further including transmitting the generated second emulated signal and trust status of the second node by the first node to an information server.

In some aspects, the techniques described herein relate to a method, wherein the receiver is part of an autonomous vehicle.

In some aspects, the techniques described herein relate to a method including: receiving an emulated GNSS signal from each node of a plurality of nodes by a computing device; receiving a trust status list from each node of the plurality of nodes by the computing device; based on the trust status list received from each node of the plurality of nodes, determining a trust status for each node of the plurality of nodes by the computing device, wherein the trust status for a node is one of trusted or not trusted; for each node of the plurality of nodes with a trust status that is trusted, transmitting the emulated GNSS signal received from the node to a position, navigation, and timing (PNT) system by the computing device; and for each node of the plurality of nodes with a trust status that is not trusted, discarding the emulated GNSS signal received from the node by the computing device.

In some aspects, the techniques described herein relate to a method, further including: receiving a GNSS signal from one or more GNSS satellites by the computing device; and based on the trust status list received from each node of the plurality of nodes, determining a trust status for the one or more GNSS satellites.

In some aspects, the techniques described herein relate to a method, further including: If the trust status of the one or more GNSS satellites is trusted, transmitting the GNSS signal to the PNT system; and If the trust status of the one or more GNSS satellites is not trusted, discarding the GNSS signal.

In some aspects, the techniques described herein relate to a method, wherein the plurality of nodes includes at least four nodes.

In some aspects, the techniques described herein relate to a system, wherein the PNT system is part of an autonomous vehicle.

In some aspects, the techniques described herein relate to a system including: one or more GNSS satellites; and a plurality of nodes, wherein each node is adapted to: receive a GNSS signal from the one or more GNSS satellites; receive a first emulated GNSS signal from another node of the plurality nodes; based on the received GNSS signal and the first emulated GNSS signal, determine a trust status of the another node; generate a second emulated GNSS signal from the received GNSS signal; and transmit the generated second emulated signal and trust status of the another node to a receiver.

In some aspects, the techniques described herein relate to a system, wherein the plurality of nodes includes at least four nodes.

In some aspects, the techniques described herein relate to a system, wherein each node is further adapted to: based on the received GNSS signal, determine a trust status of the one or more GNSS satellites; and transmit the generated second emulated signal, the trust status of the another node, and trust status of the one or more GNSS satellites to the receiver.

In some aspects, the techniques described herein relate to a system, wherein each node is further adapted to: determine a time; compare the determined time with a time from the received GNSS signal; and based on the determined time and the time from the received GNSS signal, determine the trust status of the one or more GNSS satellites.

In some aspects, the techniques described herein relate to a system, wherein each node is further adapted to: determine a trust status of the node; and transmit the generated second emulated signal, trust status of the another node, and the trust status of the node to the receiver.

In some aspects, the techniques described herein relate to a system, wherein the node adapted to determine the trust status of the node includes the node adapted to: receive data indicating whether the node was compromised, and determine the trust status of the node using the received data.

In some aspects, the techniques described herein relate to a system, wherein the receiver is part of a position, navigation, and timing (PNT) system.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 4 is an illustration of a method for operating a node in a GNSS system;

FIG. 5 is an illustration of a method for determining the GNSS signals to transmit to a receiver.

DETAILED DESCRIPTION

Figure 1:
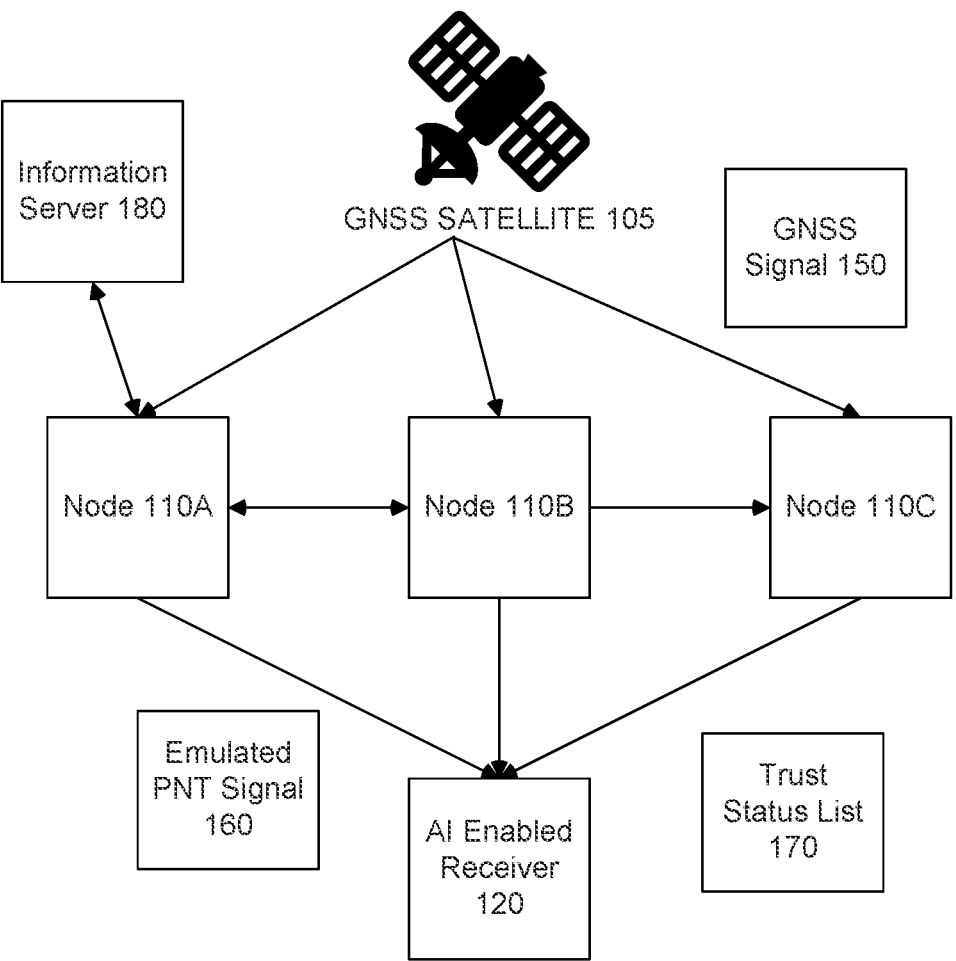
FIG. 1 is an illustration of an exemplary environment for improving the redundancy and reliability of the Global Navigation Satellite System.

FIG. 1 is an illustration of an exemplary environment 100 for improving the redundancy and reliability of the Global Navigation Satellite System (GNSS). As shown, the environment 100 includes a GNSS satellite 105, one or more nodes 110 (e.g., the nodes 110A, 110B, and 110C), an AI-enabled receiver 120, and an information server 180. More or fewer components may be supported. Each of the nodes 110, receiver 120, and information server 180 may be implemented using one or more computing devices such as the computing device 600 illustrated with respect to FIG. 6.

The GNSS satellite 105 may generate one or more GNSS signals 150. A GNSS signal 150 may include a variety of information that may be used by the nodes 110 (also referred to as AI nodes 110) to determine the reliability of the positioning, navigation and timing (PNT) of the received GNSS signals 150. For example, the receiver 120 may be part of an autonomous vehicle and may use the received GNSS signal 150 to determine the location of the autonomous vehicle and a route for the autonomous vehicle to travel. The GNSS satellites 105 may include GPS constellation satellites, Glonass satellites, Biedou satellites, and satellites associated with other regional systems.

As may be appreciated, in the event that some or all of the GNSS satellites 105 become unavailable due to interference, malfunction, or an attack by a malicious party, the receivers 120 that rely on GNSS signals 150 for PNT may become unresponsive. Even worse, if the malicious party is able to take control (spoofing) to purposely provide incorrect GNSS signals 150, the receiver 120 may make confusing, unreliable and dangerous decisions based the incorrect GNSS signals 150. As may be appreciated the receiver 120 may be part of an autonomous vehicle and may use the received GNSS signal 150 to determine the location of the autonomous vehicle, and a route for the autonomous vehicle to travel.

Accordingly, to protect against such attacks, and provide an additional layer of redundancy to GNSS systems, the environment 100 may further include the plurality of AI nodes 110. The AI nodes 110 may form what is referred to as a ground mesh network that provides redundancy and real-time attack mitigation for the GNSS system.

The ground mesh network may be formed by two or more nodes 110 and may scale up to as many number units as necessary, based on the area to be covered for a safe PNT. The mesh network may use Artificial Intelligence based neural network among more than one node 110 and with the information server 180. The AI based synchronization methods may be implemented to synchronize timing and data transfer between the nodes 110 and with the information server 180. The geographical area may range from a local area of few meters squared up to a city or state. Further, the mesh network may be scaled to larger network of multiple mesh networks that are synchronized at a broader level.

Each node 110 may be distributed across a geographic region such as a country, city, state, or county. Each node 110 may receive a GNSS signal 150 from the GNSS satellite 105 and may also receive an emulated safe PNT signal 160 from some or all of the other nodes 110 in its visibility. The emulated safe PNT signal 160 may be generated by a node 110 using a variety of information from the received GNSS signal 150, a local atomic clock associated with the node 110, a known location of the node 110, signals 160 from other nodes 110 in the mesh network, and from asynchronized master atomic clock or ensemble of clocks located at the information server 180 or another location. Other information may be used.

In some embodiments, the GNNS signal 150 may consists of satellite ephemeris and UTC derived timing information, for instance the GPS time, embedded on an L1, L2 or any other signal frequency. In total there may be about 32 or more parameters in the signal 150. The emulated PNT signal 150 is similar to the GNSS signal 160, generated at LN, but with a precise knowledge of its fixed location and with a precise local atomic clock.

Each node 110 may further generate what is known as a trust status list 170. The trust status list 170 generated by a node 110 may include an entry for some or all of the other nodes 110 along with an indication of whether or not the node 110 generating the trust status list 170 believes that the node 110 is trusted or not trusted. The indication may be binary (i.e., trusted or not trusted) or may be a percentage (i.e., 85% trusted). Other indications and/or 'alert messages' to the AI enabled receiver 120 may be used.

Depending on the embodiment, the trust status list 170 generated by a node 110 may further include an indication of whether the GNSS satellite 105 is trusted or not trusted. In addition, the trust status list 170 may include an indication of whether the node 110 believes that itself, or some of the other nodes 110 in the mesh network, is trusted or not trusted.

A node 110 may determine if another node 110 is trusted using an artificial intelligence-based model. The model may consider a variety of factors such as the emulated safe PNT signal 160 received from the node 110, a time associated with the safe PNT signal 160, an accurate time generated locally by the node 110, and the GNSS signal 150 received from the GNSS satellite 105. Other data may be considered by the node 110 such as information that would indicate or suggest that one or more nodes 110 have been hacked or are behaving in an otherwise unexpected or compromised way. The node 110 may similarly use the artificial intelligence-based model to determine if it can trust itself and/or trust the GNSS satellite 105. Depending on the embodiment, the model may be a deep recurrent neural network and may be trained using deep reinforced learning methods or auto encoder method. Other types of models and/or training methods may be used.

The receiver 120 may receive emulated PNT signals 160 and trust status lists 170 from some or all of the nodes 110 in its visible range and may simultaneously receive the GNSS signal 150 from the GNSS satellite 105. The receiver 120 may have the capability to understand any alert messages transmitted by the nodes 110 and determine which signals are trustworthy based on trust status lists 170 to evaluate the integrity of the GNSS signal 150 and utilize either or both of the GNSS signals 150 and the safe PNT signals 160.

In some embodiments, the receiver 120 may use an artificial intelligence-based algorithm and the trust status lists 170 to determine which signals (i.e., GNSS signal 150 or safe PNT signals 160) are associated with a likely trusted source and which are associated with a likely untrusted source. The signals associated with likely untrusted sources may be discarded by the receiver 120 and the receiver 120 may compute its position and time using only the signals that can be fully trusted. Generally, the algorithm used by the receiver 120 may use information received from a minimum of one to four nodes 110 to independently determine the PNT fix when GNSS signals 150 are unreliable or unavailable. However, more or fewer nodes 110 may be supported.

In some embodiments, some or all of the nodes 110 may communicate with the information server 180. The information server 180 may collect the safe PNT signals 160 generated by the nodes 110 and the trust status lists 170 and may process the trust status lists 170 to determine the safety statuses of the nodes 110 and the one or more GNSS satellites 105. An administrator of the information server 180 may use the collected information to determine which nodes 110 and/or GNSS satellites 105 may have been compromised. Such information may be communicated to one or more authorities who may use the information to prevent or thwart a possible attack on the GNSS system. Nodes 110 may be connected to form a mesh network via the optical fibers and/or wireless networking. The information server 180 may consist of ultra-stable atomic clocks or an ensemble of atomic clocks which are synchronized to the Universally Coordinated Time (UTC). The information server 180 may be used to synchronize the nodes 110 and maintain the mesh network time to sub-nanosecond accuracy over a month or more.

The information server 180 may further send information indicative of an attack or hacking attempt to each of the nodes 110. The information may be used by the nodes 110 when determine their trust status lists 170.

The node based GNSS system described herein provides many advantages over the prior art. First, because each node 110 generates an emulated GNSS-like safe PNT signal 160, the AI-enabled receiver 120 may be able to use the safe PNT signals 160 for uncompromised PNT determination even when one or more GNSS satellites 105 have been disabled or compromised. Second, because the receiver 120 uses an AI-based algorithm to determine which received signals may be trusted, the receiver 120 may utilize a portion of the received signals for an accurate and resilient PNT determination even when some of the nodes 110 have been compromised or hacked.

Figure 2:
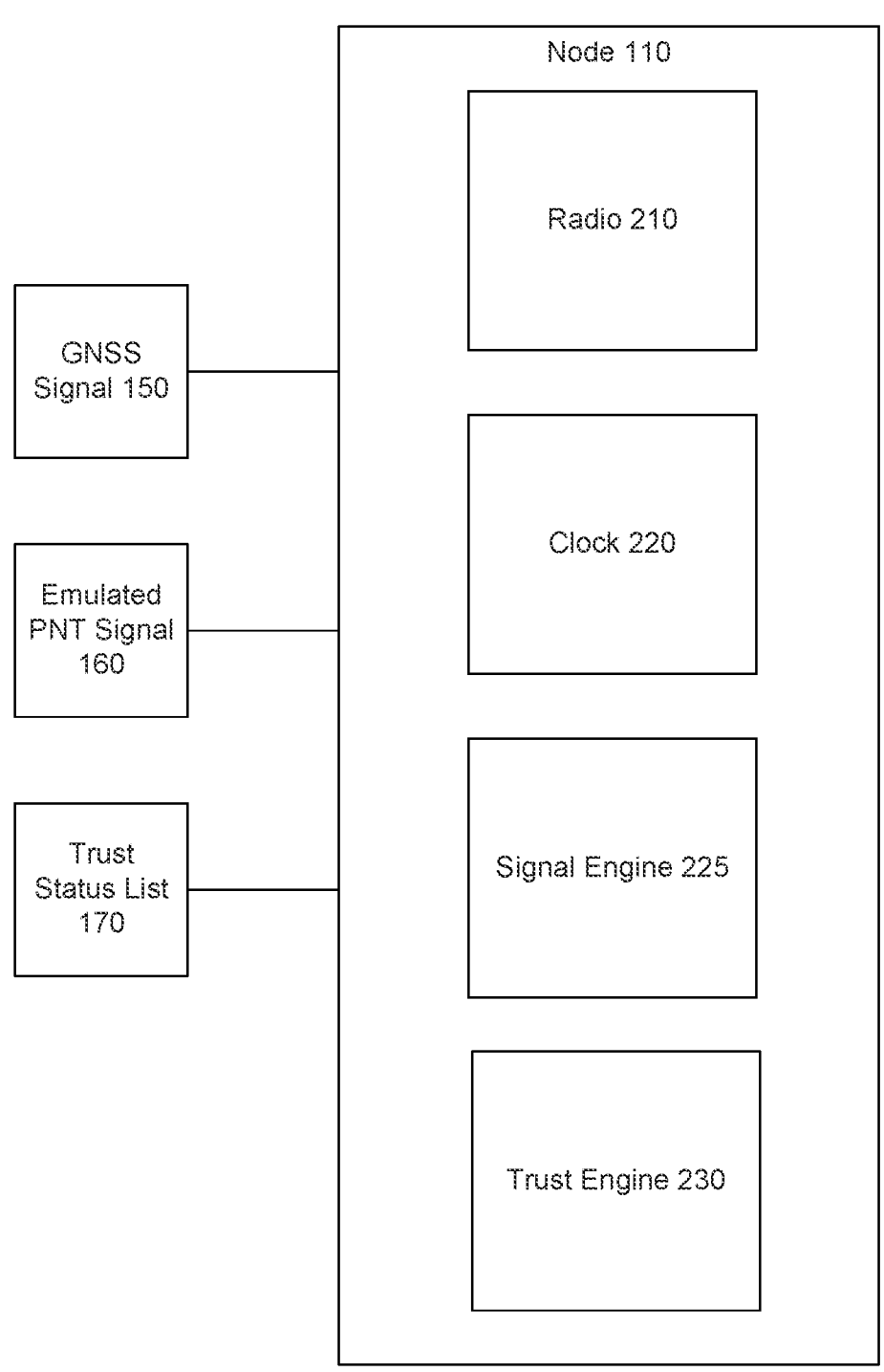
FIG. 2 is an illustration of an example node.

FIG. 2 is an illustration of an example node 110. As illustrated, the node 110 includes a radio 210, a clock 220, a signal engine 225, and a trust engine 230. More or fewer components may be supported. Some or all of the components of the node 110 may be implemented together or separately using one or more computing devices such as the computing device 600 illustrated with respect to FIG. 6.

The radio 210 may include a transmitter and a receiver and may be capable of receiving GNSS signals 150 from one or more GNSS satellites 105. The radio 210 may further be capable of transmitting and receiving data from one or more other nodes 110. The data may include emulated GNSS-like safe PNT signals 160 and trust status lists 170. Other data may be supported.

The radio 210 may further be capable of receiving and transmitting data from the information server 180. Any type of radio 210 may be used.

The clock 220 may generate a current time for the node 110. The current time may be incorporated for precise timestamping into the emulated GNSS-like safe PNT signal 160 generated by the node 110. In some embodiments, the clock 220 may be an atomic clock such as a chip scale atomic clock or any portable clock with precision/stability of 8E-10 or better. Other types of portable clocks may be supported.

In some embodiments, the clock 220 may have an artificial intelligence-based component, such that if the clock 220 becomes damaged, the node 110 may continue to generate a current time. The artificial intelligence-based component may be a model that is trained to generate a current time for the clock 220 based on previous times generated by the clock 220, times in GNSS signals 150 received from the GNSS satellites 105, accurate and synchronized time received in GNSS-like emulated PNT signals 160 generated by other nodes 110, and the synchronized time from a master clock in the information server 180. The model may further help account for drift and other instabilities associated with the atomic clock. This may allow the clock 220 of the node 110 to precisely determine the time in the event of an attack to the GNSS satellites 105 and/or other nodes 110 for up to a month or more.

The signal engine 225 may generate an emulated GNSS-like safe PNT signal 160 for the node 110. Depending on the embodiment, the signal engine 225 may generate the emulated PNT signal 160 using the time generated by the clock 220 and a location associated with the node 110. In addition, other information may be used to generate the emulated PNT signal 160 including information from the received GNSS signal 150 and information from one or more other emulated PNT signals 160 received from other nodes 110. Any method for generating an emulated safe PNT signal 160 may be used.

The trust engine 230 may determine the trust values of the trust status list 170 for the node 110. Depending on the embodiment, the trust engine 230 may determine trust values for each node 110 that the node 110 communicates with, the one or more GNSS satellites 105, and the other nodes 110 in the mesh network.

The trust engine 230 may determine the trust values for the trust status list 170 using an artificial intelligence-based model. The model may have been trained and provided by the information server 180. When determining whether a node 110 (or GNSS satellite 105) is trustworthy, the model may consider the emulated PNT signals 160 received from the local node 110 so far, the emulated PNT signals 160 received from other nodes 110, and the GNSS signals 150 received from the one or more GNSS satellites 105. Other information in terms of navigation parameters necessary to determine the anomalies and attacks may be used.

The model may further consider data received from the information server 180 that would indicate reasons why the node 110 may be trusted or not trusted. For example, the information server 180 may provide data that includes evidence that a cyberattack has been detected, or evidence that other nodes 110 have been compromised or are malfunctioning.

In some embodiments, the information server 180 may periodically update the model that is used by the trust engine 230 to determine whether a node 110 is trusted or not trusted. This may allow the information server 180 to continuously account for new types of cyberattacks that are detected, and to revise the model used by the trust engine 230 when the trust engine 230 fails to recognize compromised nodes 110 as not trusted or when the trust engine 230 incorrectly labels a non-compromised node as trusted.

Figure 3:
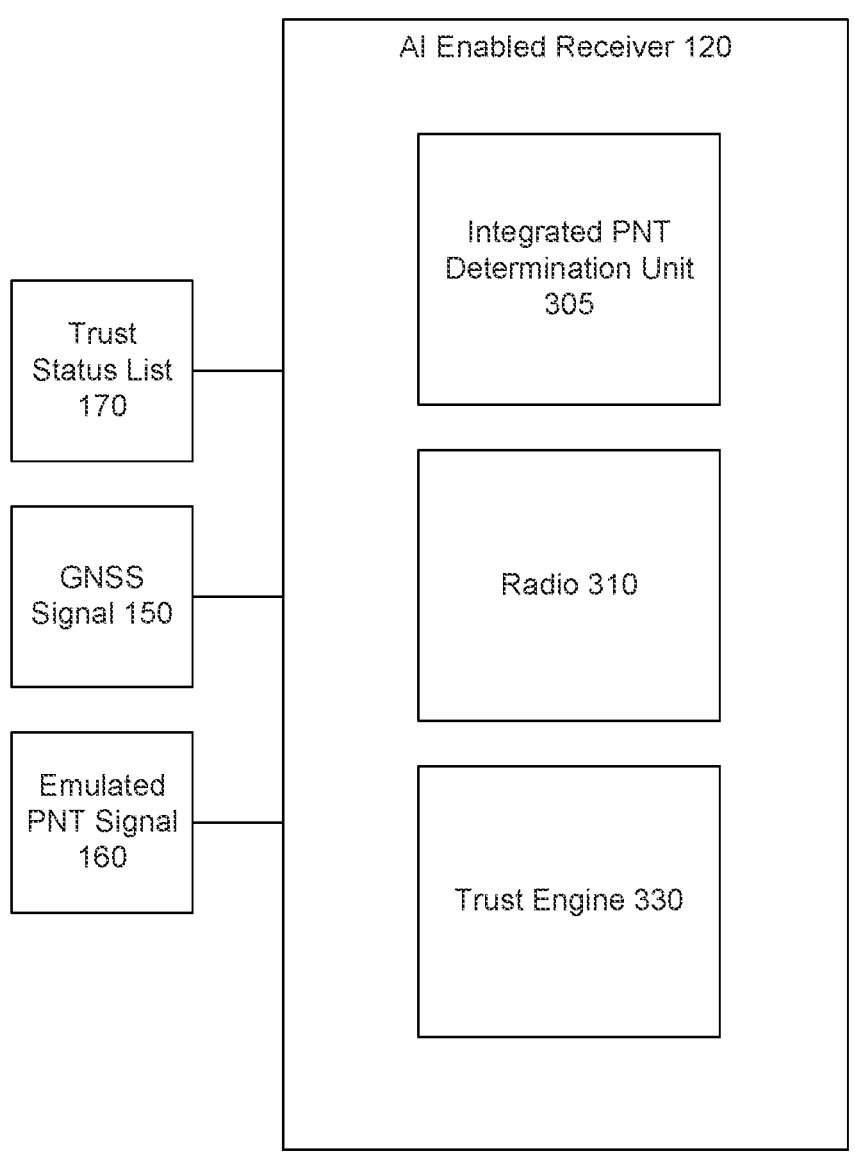
FIG. 3 is an illustration of an example receiver.

FIG. 3 is an illustration of an example AI-enabled receiver 120. As illustrated, the receiver 120 includes an integrated PNT determination unit 305, a radio 310, and a trust engine 330. More or fewer components may be supported. Some or all of the components of the receiver 120 may be implemented together or separately using one or more computing devices such as the computing device 600 illustrated with respect to FIG. 6.

The radio 310 may include a transmitter and a receiver and may be capable of receiving GNSS signals 150 from one or more GNSS satellites 105 and receiving emulated GNSS-like safe PNT signals 160 and trust status lists 170 from one or more nodes 110. The radio 310 may be substantially similar to the radio 210 described with respect to FIG. 2.

The trust engine 330 may receive trust status lists 170 from the nodes 110 and may use the trust status lists 170 to determine which nodes 110 can be trusted as well as whether the GNSS satellites 105 can be trusted. In some embodiments, the trust engine 330 may determine that a node 110 can be trusted if a threshold number or percentage of nodes 110 indicate that the node 110 is trusted in their trust status list 170. The threshold number or percentage may be set by a user or administrator at the information server 180 or locally at each node 110 depending on the resilient requirement. In some embodiments, to determine which nodes can be trusted, a single trust status list 170 from a node 110 made be suffrutescent. To determine PNT, four to seven signals 150 or 160 may be needed. However, increasing the number of signals 150 or 160 may result in a more accurate and precise PNT.

Alternatively, the trust engine 330 may use an artificial intelligence-based model to determine what nodes 100 can be trusted. The model may consider the trust status lists 170 received from each node 110 along with other information such as the relative trustworthiness of each node 110. For example, a trust status list 170 from a node 110 that itself is listed as "not trusted" in several trust status lists 170 may be given less weight or consideration by the trust engine 330 when determining which nodes 110 (or GNSS satellites 105) may be trusted or not trusted. The model may be provided by the information server 180 or it may run locally on each node 110. The engine 330 collects all or selected GNSS navigation parameters from the received signals 150 and trains the AI algorithm from the collected and accumulated data over a period of few months and hence it can compare to immediately identify for any anomalies or variations detected for the signals from the each and every GNSS satellite 105.

The trust engine 330 may further consider information received from the information server 180 when determining the trust status of each node 110. The information may include evidence of possible cyberattacks, or other attacks, on the nodes 110 or GNSS satellites 105. For example, if evidence of a planned cyberattack is detected, the information server 180 may relay that information to the AI-enabled receiver 120. In response, the trust engine 330 may increase the standard by which a node 110 is judged to be trusted or not trusted.

After the trust engine 330 determines the nodes 110 that are trusted or not trusted, the integrated resilient PNT determination unit 305 may utilize only the uncompromised GNSS signals 150 and the safe signals 160 from the nodes 110 for PNT. For example, the integrated resilient PNT determination unit 305 may use the trusted signals 150 and 160 for PNT in an autonomous vehicle, robot, or other entity that uses PNT. The trust engine 330 may then block or discard the emulated GNSS signals 160 from the not trusted nodes 110 so that they are not used by the receiver 120.

In some embodiments, the emulated PNT signals 160 and indications of the associated not trusted nodes 110 may be provided to the information server 180 via the mesh network. The information server 180 may then use the information to determine if in fact a cyberattack is being performed, or to update the models used by the nodes 110 and/or receiver 120 to judge the trustworthiness of the nodes 110 and the GNSS satellite 105.

FIG. 4 is an illustration of a method 400 for operating a node in a GNSS system. The method 400 may be performed by one or more nodes 110.

At 410, a GNSS signal is received. The GNSS signal 150 may be received by a node 110 from one or more GNSS satellites 105. The GNSS signal 150 may include information that may be directly used by an AI-enabled receiver 120 to perform PNT. For example, the GNSS signal 150 may include timing and location information that may be used by a receiver 120 of an autonomous vehicle for route planning.

At 420, a first emulated PNT signal may be received from a second node in the mesh network of nodes 110. In addition, emulated PNT signals 160 may be received from other nodes 110 in the mesh network. The first emulated PNT signal 160 from a node 110 may include similar information as the received GNSS signal 150 but may be generated by the node 110 using information such as the received GNSS signal 150, other emulated PNT signals 160 received by the second node 110 in the mesh network, and timing information generated at the node by a clock 220 or provided by the information server 180. The first and second nodes 110 may be part of a plurality of nodes 110 that are distributed across a geographic area. An emulated PNT signal 160 may be received from each visible node in the mesh network.

At 430, a trust status is generated for the second node. The trust status may be generated by the first node 110 for the second node 110 based on information such as the received GNSS signal 150 and the first node's PNT signal 160 status. Other information may be considered such as a current time associated with the first node 110, a history of GNSS signals 150 received so far, other emulated GNSS signals 160 received from the second node 110 and other nodes 110 in the mesh network, as well as data indicative of a cyberattack or other attack on any node 110 in the network. The trust status may be generated for each visible node in the in the mesh network.

Depending on the embodiment, the trust status may be either trusted or not trusted and may be determined by the trust engine 230 of the first node 110 using some or all of the above described information and an artificial intelligence-based model. The model may have been locally trained by, and/or received from, the information server 180. The determined trust status for the second node 110 may be added to a trust status list 170 that includes a trust status for every node 110 that the first node 110 interacts with or is aware of (i.e., that is visible). The trust status list 170 may further include a trust status for the one or more GNSS satellites 105 and a trust status for the first node 110 (and other nodes in the mesh network).

At 440, a second PNT signal is generated. The second safe PNT signal 160 may be generated by the signal engine 225 of the first node 110. The second PNT signal 160 may be generated based on a variety of information including the received GNSS signal 150, a location of the first node 110, a time generated by the clock 220 of the first node 110, and one or more of the PNT signals 160 received from the other nodes 110.

At 450, the PNT signal and the trust status of the second node are transmitted. The PNT signal 160 and trust status may be transmitted to an AI-enabled receiver 120. The trust status may be transmitted as part of the trust status list 170. The receiver 120 may receive PNT signals 160 from some or all of the nodes 110 in the region, along with trust status lists 170, and may use the trust statuses in each of the trust status lists 170 to determine which nodes 110 (and the one or more GNSS satellites 105) can be trusted, and which nodes 110 may be compromised or malfunctioning. The receiver 120 may then utilize the signals received from trusted nodes 110 (or the one or more GNSS satellites 105) and may discard the other signals.

FIG. 5 is an illustration of a method 500 for determining what GNSS signals to utilize by the AI-enabled receiver 120.

At 510, emulated PNT signals are received from each node of a plurality of nodes. The emulated PNT signals 160 may be received by the receiver 120. The receiver 120 may be part of, or separate from, a navigation system. In addition, a GNSS signal 150 may be received from one or more GNSS satellites 105. Each node 110 may have a known location and the nodes 110 may be distributed across a geographic area. In some embodiments there may be at least seven nodes 110. More or fewer nodes 110 may be supported.

At 520, a trust status list is received from each node 110 of the plurality of nodes 110. The trust status lists 170 may be received by the receiver 120. Each trust status list 170 received from a node 110 may include a trust status determined by the node 110 for each of the other nodes 110. The trust status may be trusted or not trusted. In addition, there may be a trust status for the GNSS satellites 105 in each trust status list 170.

At 530, a trust status is determined for each node of the plurality of nodes using the trust status lists. The trust status for each node 110 may be determined by the trust engine 330 of the receiver 120. In some embodiments, the trust engine 330 may determine the trust status for a node 110 by looking at the trust status determined for the node 110 by each of the other nodes 110. The trust engine 330 may use an artificial intelligence-based algorithm or may use a consensus algorithm that uses the trusts status reported by a majority of the nodes 110. The trust engine 330 may similarly determine a trust status for the one or more GNSS satellites 105.

At 540, the emulated PNT signals 160 for each node with a trust status of not trusted are discarded (i.e., not used by the receiver 120 for PNT). If the trust status of the one or more GNSS satellites 105 is not trusted, the receiver 120 may similarly the GNSS signal 150.

At 550, the emulated PNT signals 160 for each node with a trust status of trusted are selected for use by, the receiver 120 for an accurate and reliable PNT determination. The determined PNT may be used for navigational purposes, for example. Similarly, the GNSS signal 150 associated with trusted GNSS satellites 105 may be used for PNT.

Figure 6:
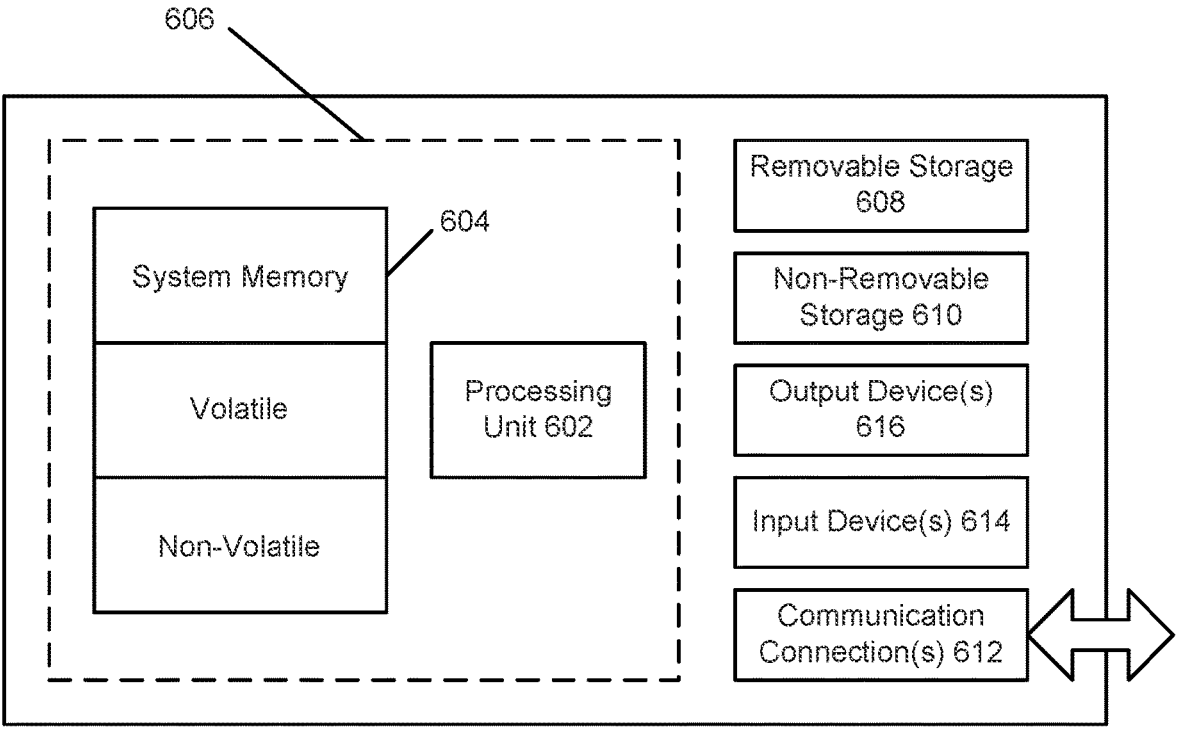
FIG. 6 shows an exemplary computing environment in which example embodiments and aspects may be implemented.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, Field Programmable Gate Arrays (FPGAs), Application Specific Integrated Circuit (ASIC), and distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random-access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. The communication connections 612 may include 3G/4G/5G and optical networking connections. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving a GNSS signal from each of one or more GNSS satellites by a first node of a plurality of nodes;
performing a crosslink synchronous communication between the plurality of nodes by the first node;
receiving an emulated AI capable Positioning, Navigation and Timing ("PNT") signal from each node of the plurality of nodes by the first node;
based on the received GNSS signal and each received emulated AI capable PNT signal, using an AI model to determine a trust status of each node of the plurality of nodes and synchronization between the plurality of nodes by the first node, wherein the AI model takes as input each received emulated AI capable PNT signal and the received GNSS signal, and further wherein the trust status of each node includes the trust status of the first node;
generating an emulated AI capable PNT signal using the received GNSS signal and each of the received emulated AI capable PNT signals; and
transmitting the generated emulated AI capable PNT signal and the determined trust statuses to a user receiver.

2. The method of claim 1, wherein the trusts status of a node indicates whether or not the node was hacked or not-hacked.

3. The method of claim 1, further comprising:
based on the received GNSS signal, determining a trust status of each of the one or more GNSS satellites the; and
transmitting the generated emulated AI capable PNT signal, the trust status of the nodes, and trust status of the one or more GNSS satellites to a ground navigation system.

4. The method of claim 3, further comprising:
generating a precise local time using an atomic clock by the first node;

comparing the generated local time with one or more timing and clock errors from the received GNSS signals by the first node; and determining the trust status of the one or more GNSS satellites by the first node based on an AI algorithm comparison protocol.

5. The method of claim 1, wherein the plurality of nodes are part of a mesh network.

6. The method of claim 5, wherein the mesh network may be connected via the optical fibers and/or wireless networking, the information server may consist of ultra-stable atomic clocks or an ensemble of atomic clocks which are synchronized to the Universally Coordinated Time (UTC), the information server may be used to synchronize the nodes and maintain the mesh network timing.

7. A method comprising:

receiving a Positioning, Navigation and Timing ("PNT") signal from each node of a plurality of nodes by a receiver;

receiving a GNSS signal from one or more GNSS satellites by the receiver;

receiving a trust status list from each node of the plurality of nodes by the receiver;

based on the trust status list received from each node of the plurality of nodes, using an AI model to determine a trust status for each node of the plurality of nodes by the receiver and a trust status for each GNSS satellite of one or more GNSS satellites, wherein the trust status for a node or a GNSS satellite is one of trusted or not trusted;

for each node of the plurality of nodes and each GNSS satellite with a trust status that is trusted, using the PNT signal received from the node and GNSS satellite to provide PNT by the receiver; and for each node of the plurality of nodes and GNSS satellite with a trust status that is not trusted, discarding the PNT signal received from the node by the receiver.

8. The method of claim 7, further comprising:

If the trust status of the one or more GNSS satellites is trusted, using the GNSS signal to provide PNT by the receiver; and If the trust status of the one or more GNSS satellites is not trusted, discarding the GNSS signal by the receiver.

9. The method of claim 7, wherein the plurality of nodes comprises any number of nodes depending on the geographical area to be covered.

10. A system comprising:

a receiver;

one or more GNSS satellites; and a plurality of nodes, wherein each node is adapted to:

receive a GNSS signal from the one or more GNSS satellites;

receive a first emulated Positioning, Navigation and Timing ("PNT") signal from another node of the plurality nodes;

based on the received GNSS signal and the first emulated PNT signal, use an AI model to determine a trust status of the another node and the node, wherein the AI model takes as input each received first PNT signal and the received GNSS signal;

generate a second emulated PNT signal from the received GNSS signal and the first emulated PNT signal; and transmit the generated second emulated PNT signal and trust status of the another node and the node to the receiver.

11. The system of claim 10, wherein each node is further adapted to:

based on the received GNSS signal, determine a trust status of the one or more GNSS satellites; and transmit the generated second PNT signal, the trust status of the another node in the mesh network, and trust status of the one or more GNSS satellites to the receiver.

12. The system of claim 10, wherein each node is further adapted to:

determine a time;

compare the determined time with the time from the received GNSS signal; and based on the determined time and the time from the received GNSS signal, determine the trust status of the one or more GNSS satellites.

13. The system of claim 10, wherein each node is further adapted to:

determine a trust status of the node; and transmit the generated second emulated PNT signal, trust status of the another node, and the trust status of the node to the navigation system.

14. The system of claim 13, wherein the node adapted to determine the trust status of the node comprises the node adapted to:

receive data indicating whether the node was compromised, and determine the trust status of the node using the received data.

* * * * *